United States Patent
Sugata et al.

(10) Patent No.: US 7,025,544 B2
(45) Date of Patent: Apr. 11, 2006

(54) MACHINE TOOL AND LUBRICANT JETTING STATE DETECTOR FOR MACHINE TOOL

(75) Inventors: Shinsuke Sugata, Fukuyama (JP); Tadashi Makiyama, Onomichi (JP)

(73) Assignee: Horkos Corp., Fukuyama (JP)

(*) Notice: Subject to any disclaimer, the term of this patent is extended or adjusted under 35 U.S.C. 154(b) by 94 days.

(21) Appl. No.: 10/486,560

(22) PCT Filed: Aug. 9, 2002

(86) PCT No.: PCT/JP02/08204

§ 371 (c)(1),
(2), (4) Date: Feb. 10, 2004

(87) PCT Pub. No.: WO03/013785

PCT Pub. Date: Feb. 20, 2003

(65) Prior Publication Data

US 2004/0191013 A1    Sep. 30, 2004

(30) Foreign Application Priority Data

Aug. 10, 2001 (JP) .............................. 2001-243649

(51) Int. Cl.
  *B23C 9/00*   (2006.01)
  *B23Q 11/10*  (2006.01)
(52) U.S. Cl. .............................. 409/136; 408/8; 408/16; 408/59; 408/60; 356/436; 356/336; 356/338; 250/573; 250/574
(58) Field of Classification Search ........ 409/135–136, 409/186–187, 193–194, 207; 408/8, 16, 408/56–57, 59–60; 356/432, 436, 437, 335–338; 250/577, 573, 574, 559.11, 559.4
See application file for complete search history.

(56) References Cited

U.S. PATENT DOCUMENTS

| | | | | |
|---|---|---|---|---|
| 3,954,342 A | * | 5/1976 | Boeke | 356/438 |
| 4,340,326 A | * | 7/1982 | Buonauro et al. | 408/16 |
| 4,792,699 A | * | 12/1988 | Duncan | 250/577 |
| 5,825,017 A | * | 10/1998 | Pryor | 250/559.08 |
| 6,287,058 B1 | * | 9/2001 | Arai et al. | 409/136 |

(Continued)

FOREIGN PATENT DOCUMENTS

DE    10231300 A1 *  1/2004

(Continued)

*Primary Examiner*—Erica Cadugan
(74) *Attorney, Agent, or Firm*—Merek, Blackmon & Voorhees, LLC (57) ABSTRACT

A machine tool capable of jetting atomized lubricant (h) forward from the tip of a cutter (17), characterized by comprising a lubricant jetting state detector for detecting the jetting state of the atomized lubricant from the tip of the cutter, the lubricant jetting state detector further comprising a guide member (21) having a straight inner hole (21a), wherein a light detection device for detecting the degree of transmission or reflection of the detection light due to injecting the direction light (c) to a specified position (b) inside the inner hole through a transparent member installed on the peripheral wall portion of the guide member or through the transparent peripheral wall portion of the guide member, and a fluid feed device (23) for feeding clean fluid of rather thin layer flowing in a specified direction along the longitudinal direction of the inner hole is installed near the inner surface of the transparent member or so as to cover the transparent peripheral wall portion, whereby a defective part due to the work machining with insufficient lubricant can be surely prevented from being produced.

5 Claims, 5 Drawing Sheets

U.S. PATENT DOCUMENTS

2005/0161622 A1 * 7/2005 Bell et al. ................ 250/493.1

FOREIGN PATENT DOCUMENTS

| JP | 1-199754 A | 8/1989 |
| JP | 6-277987 A | 10/1994 |
| JP | 2000 141162 A | 5/2000 |
| JP | 2001-219338 A * | 8/2001 |
| JP | 2001-311500 A * | 11/2001 |

* cited by examiner

MACHINE TOOL AND LUBRICANT JETTING STATE DETECTOR FOR MACHINE TOOL

FIELD OF THE INVENTION

The present invention relates to a machine tool and a lubricant jetting state detector for the machine tool.

BACKGROUND OF THE INVENTION

A machine tool comprising a spindle fitted displaceably in a vertical direction and/or in a lateral direction in addition to in a longitudinal direction and a cutter forward-protrudently fixed on a front end of the spindle has been already existed. As shown therein, the tip of the cutter spouts out atomized lubricant forwardly.

In such conventional machine tool, it is important that the atomized lubricant jets suitably to carry out good work machining.

The present invention aims to provide a machine tool capable of good work machining due to detecting jetting state of atomized lubricant spouted from the tip of a cutter, and a lubricant jetting state detector for machine tool to detect jetting state of atomized lubricant spouted from the tip of the cutter.

SUMMARY OF THE INVENTION

To accomplish the above-mentioned aims, a machine tool of the present invention is so constructed that a spindle is installed displaceably in a vertical direction and/or in a lateral direction in addition to in a longitudinal direction, a cutter is forward-protrudently fixed to a front end of the spindle, and the tip of the cutter spouts atomized lubricant forward, and therein, a lubricant jetting state detector is arranged to a position within the cutter's displacement, the lubricant jetting state detector comprising a cylindrical member having a straight inner hole. Here, the lubricant-jetting state detector injects detection light to a specified position inside the inner hole through a peripheral wall portion of the cylindrical member, and detects the degree of transmission or reflection of the detection light.

According to this, the lubricant jetting state detector detects the jetting state of the atomized lubricant, and decides whether to continue the after work machining or whether to modify the jetting state of the atomized lubricant in connection with detecting results. Therefore, there hardly occur defective products due to work machining with insufficient lubricant.

Particularly, in the lubricant jetting state detector, the cutter is inserted into the cylindrical member having the straight inner hole, and detection light is injected in front of dozens of mm from the position which the atomized lubricant spouts from the tip of the cutter.

According to this, the lubricant jetting state detector automatically detects the jetting state before the machining by cutter is started and/or after it is finished, and decides whether to continue the after work machining or whether to modify the jetting state of the atomized lubricant in connection with the detecting results. Accordingly, the lubricant jetting state detector detects labor-savingly.

The above-mentioned invention will be defined as follows.

That is, it is so constructed that the after work machining of the cutter automatically stops or an abnormal jetting state is automatically modified to normal one when the lubricant jetting state detector detects abnormality to the jetting state. According to this, when detecting the abnormal jetting state of the lubricant, corresponding operation is carried out labor-savingly.

Besides, the lubricant jetting state detector also serves as a cutter existence detector. That is, it is so constructed that a cutter is automatically displaced to a cutter existence detectable position before the machining is started and/or after it is finished, and the after work machining is automatically stopped when the cutter existence detector does not detect any existence of the cutter. According to this, the following effects can be gained in addition to the above-mentioned effect. That is, when a cutter is broken to lack its tip, the cutter existence detector can not detect any existence of the cutter, and the after work machining is automatically stopped. Therefore, there labor-savingly and surely occur no defective products due to the abnormal cutter.

Besides, the lubricant jetting state detector comprises a guide member, a light detection means and a fluid feed means. The guide member has a straight inner hole, provided with the light detection means to the outside surface thereof. Here, the light detection means injects detection light to a specified position inside the inner hole through a transparent member provided to the peripheral wall portion of the guide member or through a transparent peripheral wall portion of the guide member to detect the degree of transmission or reflection of the detection light. The fluid feed means feeds clean fluid formed in rather thin layer for flowing in a specified direction along the longitudinal direction of the inner hole to cover the transparent peripheral wall portion or around an inner surface of the transparent member.

When using the above-mentioned detector, the cutter is located to a specified position inside the inner hole of the guide member. Specifically, about dozens of mm is projected on light in front from the tip of the cutter. According to this, the degree of transmission or reflection of the detection light is detected at the lubricant jetting position through the light detection means. The quality of jetting state and a jetting quantity of lubricant are judged in accordance with the detecting data. Besides, since the clean fluid fed by the fluid feed means covers the inner surface of the transparent member or the transparent peripheral wall portion of the guide member, the inner surface is never dirtied by the lubricant inside the inner hole. Therefore, the light detection means can detect without the influence of dirt. Since the fluid feed means feeds the fluid in a rather thin layer and a flow direction of the fluid is agreed with a jetting direction of the lubricant inside the inner hole, the fluid never disturbs the jetting state of the lubricant inside the inner hole. Therefore, the jetting state of atomized lubricant due to the light detection means is precisely detected.

The present invention will be further defined as follows. The fluid feed means forms circular so as to be arranged concentrically with the inner hole, and has an air injection nozzle for jetting air annularly in a size relevant to the caliber of the inner hole. In this case, it is so constructed that the air spouted from the air injection nozzle covers all inside contact surface of the specified position inside the inner hole in rather thin layer.

According to this, when displacing the jetting position of the atomized lubricant spouted from the tip of the cutter to the inside of the inner hole of the guide member, the fluid feed means never interferes with the displacement. Besides, in this case, since the air fed from the fluid feed means rather equally affects around all the jetting position of the atomized lubricant, the jetting position is never disturbed. Therefore, detecting accuracy in the jetting state of the atomized lubricant much more improves.

PREFERRED EMBODIMENT OF THE INVENTION

An embodiment of the present invention will be explained with reference to FIGS. 1 to 3 as follows.

Figure 1:
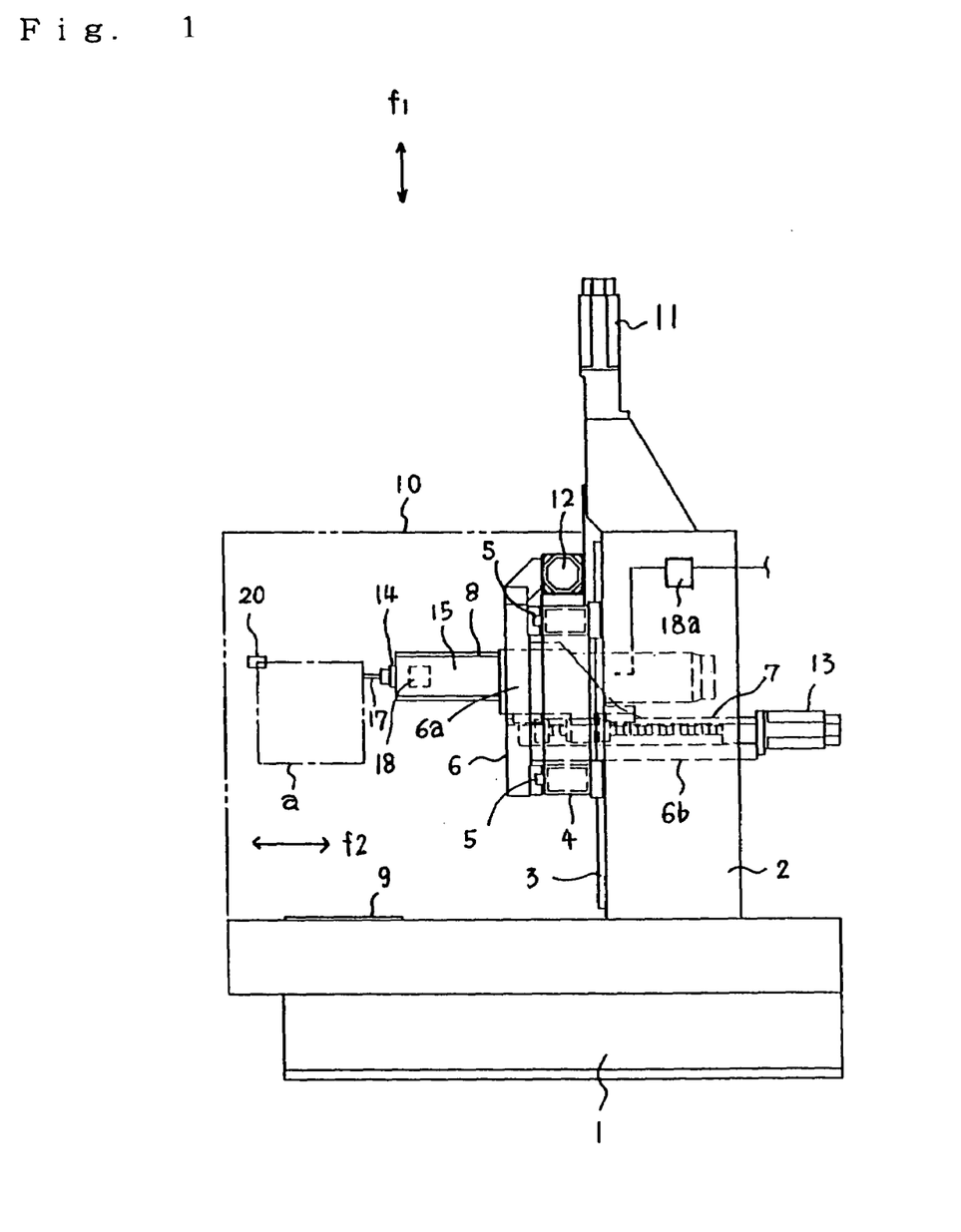
FIG. 1 is a side view of a machine tool in an embodiment of the present invention.

As shown in FIG. 1, a machine tool of this embodiment comprises a bed 1 located to the lowest part, a column 2 fixed on an upper surface of the bed 1, a first saddle 4 guided slidably-movably in a vertical direction f1 through one pair of guide rails 3 vertically fixed to right and left side parts of the front surface of the column 2, a second saddle 6 guided slidably-movably in a lateral direction through one pair of guide rails 5, 5 laterally fixed to upper and lower ends of the front surface of the first saddle 4, and a spindle unit 8 guided slidably-movably in a longitudinal direction through one pair of longitudinal guide rails 7 fixed to the second saddle 6.

Each of structures of the above-mentioned parts will be explained as follows.

The bed 1 is formed in a rectangular parallelepiped, and a work-supporting member 9 is fixedly installed on an upper surface thereof before the column 2, and the whole upper surface is covered with a boxy casing.

The column 2 comprises one pair of right and left vertical parts and one pair of upper and lower horizontal parts, forming a rectangular frame body having a rather big longitudinal hole to the center. A motor table 2a is provided to the upper horizontal part of the column 2. And on the motor table 2a, a servomotor 11 for vertically driving the first saddle 4 is fixed.

The first saddle 4 has a rather big longitudinal hole to the center, forming a vertical rectangular frame body in a size smaller than the front surface of the column 2. To the rear surface of the rectangular frame body, interfitting members for being guided with the rail members 3 are fixed, and to the front surfaces of the upper and lower horizontal parts thereof, the rail members 5, 5 are respectively fixed. And a servomotor 12 for laterally driving the second saddle 6 is provided to the upper surface of the upper horizontal part.

The second saddle 6 has a longitudinal hole for the spindle unit 8 to be inserted into to the center, forming a vertical rectangular frame body 6a in a size smaller than the front surface of the first saddle 4. To the rear surface of the rectangular frame body 6a, a horizontal inductive frame 6b is longitudinally fixed, and plenty of interfitting members for being guided with the rail members 5, 5 are fixed. Besides, on each upper surface of the horizontal inductive frame 6b, one pair of right and left longitudinal rail members is fixedly installed. And to the rear end of the horizontal inductive frame 6b, a servomotor 13 for drivingly displacing the spindle unit 8 in a longitudinal direction f2 is fixed.

The spindle unit 8 comprises a longitudinal spindle 14 and a unit main body frame 15 for rotatably supporting the spindle 14. A not-illustrated driving motor for rotatably driving the spindle 14 is provided into the frame 15, and plenty of interfitting members for being guided with the rail members 7 are provided to the lower surface of the frame 15.

On the tip of the spindle 14, a cutter 17 is forward-protrudently fixed through a tool holder 16. And inside the front of the spindle 14, a publicly known atomized lubricant generator 18 is incorporated. Here, liquid lubricant is fed into the atomized lubricant generator 18 from the outside through the rear end of the spindle 14. As shown in FIGS. 2, 3, a passageway hole 19 for flowing the atomized lubricant generated through the atomized lubricant generator 18 by way of the insides of the spindle 14 and the tool holder 16 is provided to the center of the cutter 17. And one pair of jetting holes 19a, 19a for spouting the atomized lubricant flowed into the passageway hole 19 in front of the cutter 17 is provided to the tip surface of the cutter 17.

Next, an explanation about characteristic parts in the present invention will be described.

The cutter 17 is displaced with the spindle 14 with the motors 11, 12, 13. A lubricant jetting state detector 20 for detecting jetting state of the atomized lubricant from the tip of the cutter 17 is provided to an end part within the cutter's displacement a.

Figure 2:
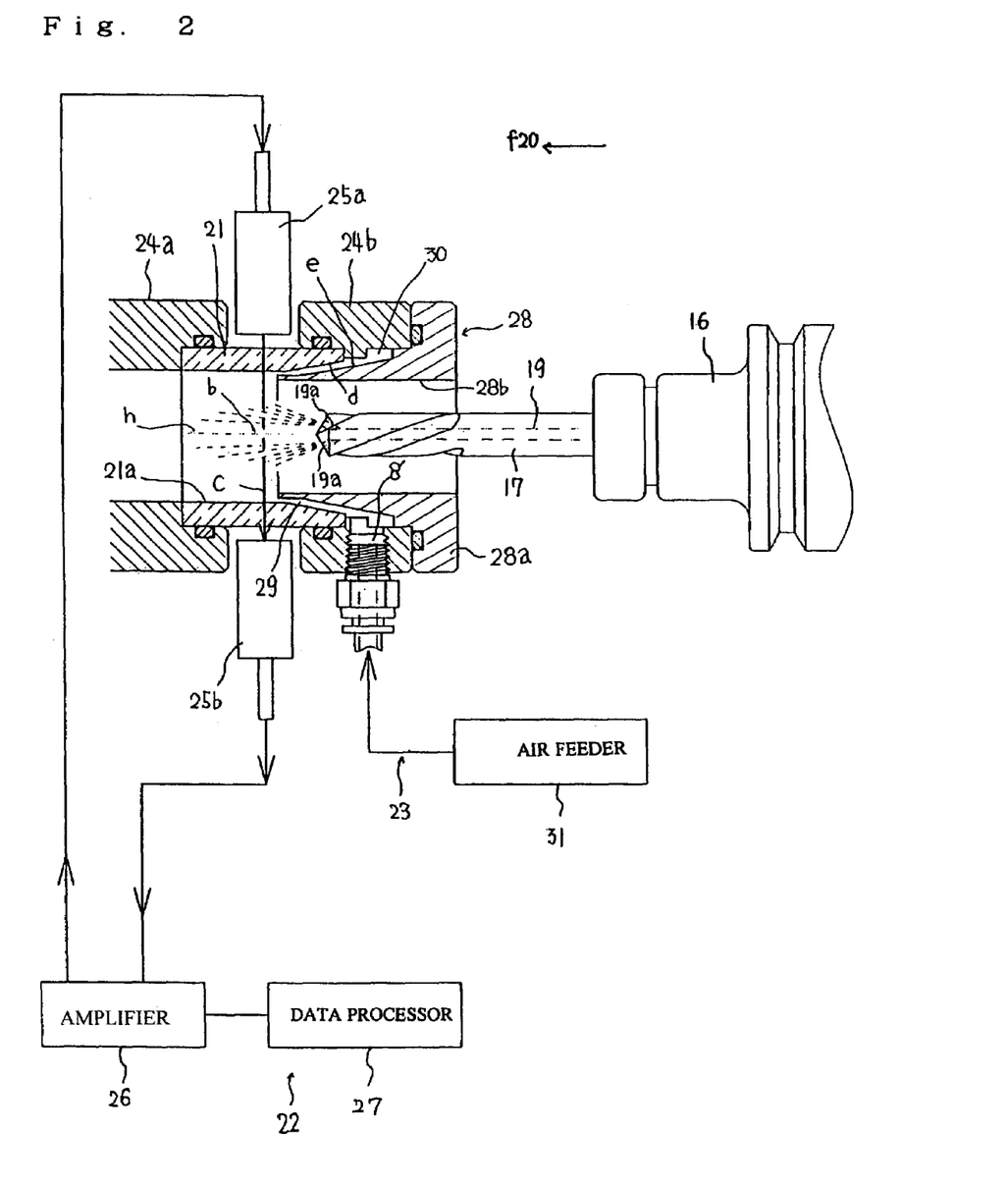
FIG. 2 is a section view showing a situation that a lubricant jetting state detector of the machine tool detects jetting state of lubricant.

In the present embodiment, as shown in FIG. 2, the lubricant jetting state detector 20 comprises a cylindrical member 21 as a guide member, a light detection means 22 and a fluid feed means 23. The cylindrical member 21 has a straight inner hole 21a, and the light detection means 22 is provided to the outside surface of the cylindrical member 21. The light detection means 22 injects detection light c to a specified position b inside the inner hole 21a through the peripheral wall portion thereof, and detects the degree of transmission or reflection of the detection light c. The fluid feed means 23 feeds clean air formed in a rather thin layer for flowing in a forward direction f20 along the longitudinal direction of the inner hole 21a to cover around an inside contact surface of the inner hole 21a.

The cylindrical member 21 is formed into a straight cylinder out of transparent members such as synthetic resin or glass, and a centerline of the inner hole 21a is turned longitudinal. The front and rear ends of the cylindrical members 21 are internally fitted and fixed to front and rear cylindrical supporting members 24a, 24b fixed to the boxy casing 10 through an O-ring airtightly.

The light detection means 22 comprises a light projector 25a, a light acceptor 25b, an amplifier 26 and a data processor 27. The light projector 25a injects the detection light c to the specified position b inside the inner hole 21a of the cylindrical member 21, and the light acceptor 25b accepts the detection light c. The amplifier 26 gathers and amplifies data of the atomized lubricant spouted from the tip of the cutter 17 through the light projector 25a and the light acceptor 25b. The data processor 27 computes the degree of transmission of the detection light c from the data sent from the amplifier 26, and decides the flow rate of the atomized lubricant. In this case, the light projector 25a and the light acceptor 25b are respectively fixed to opposite parts that put the specified position b on the outside surface of the cylindrical member 21 therebetween.

The fluid feed means 23 comprises the rear part of the cylindrical member 21, the rearward cylindrical supporting member 24a and an inward circular member 28, arranged concentrically with the cylindrical member 21. And the whole shape of the fluid feed means 23 forms circular.

The rearward inside surface of the cylindrical member 21 is formed into a taper female surface d. The inward circular member 28 is so constructed that the forward outside contact surface forms a taper male surface e, the rear end forms a flange part 28a, and an inner hole 28b forms a straight tubular surface concentric with the taper male e. The taper male surface e is located inside the rearward cylindrical supporting member 24b concentrically with the taper female surface d, and the flange part 28a is fixedly bolted to the rear end surface of the rearward cylindrical supporting member 24b.

In this case, the taper female surface d and the taper male surface e form a circular air injection nozzle 29, and the taper female surface d and the inside contact surface of the rearward cylindrical supporting member 24b form an air feed chamber 30. Air is fed into the air feed chamber 30 from an external air feeder 31 through a through hole g formed to the peripheral wall portion of the rearward cylindrical supporting member 24b.

The data relevant to the transmissivity of the detection light c and the flow rate of the atomized lubricant detected through the lubricant jetting state detector 20 are communicated to a not-illustrated computer control board. A flow rate-adjusting valve 18a is provided to a feed line of the liquid lubricant fed into the atomized lubricant generator 18 shown in FIG. 1. A control unit for controlling the flow rate-adjusting valve 18a and the motors 11, 12, 13 in connection with the flow rate of the atomized lubricant or the transmissivity of the detection light c detected through the lubricant jetting state detector 20 is incorporated in the computer control board.

Next, an operation example of the machine tool in the above-mentioned embodiment will be explained.

A work is fixed on the work supporting member 9, and machining data of machining order etc. are inputted into the computer control board, and thereafter, work machining is started.

According to this, the following treatments and operations are carried out automatically.

First, a spindle motor rotates the cutter 17 integrally with the spindle 14a. Besides, another necessary motors displace the cutter 17 to detectable position of the lubricant jetting state detector 20 with the displacement of the spindle 14 as shown in a solid line of FIG. 2, and stop it there once.

Then, the fluid feed means 23 spouts the clean air from the air injection nozzle 29. The spouted air forms a rather thin circular layer, flowing forward, then covering the whole inside contact surface around the specified position b of the inner hole 21a of the cylindrical member 21. Thereafter, the liquid lubricant is fed into the atomized lubricant generator 18 under predetermined initial conditions. According to this, the atomized lubricant generator 18 produces atomized lubricant h, spouting it forward from the tip of the cutter 14 as shown in FIG. 2.

On the other hand, the light projector 25a injects the detection light c to the specified position b inside the inner hole 21a through the transparent cylindrical member 21. The injected detection light c permeates the jetting atomized lubricant h at the transmissivity relevant to concentration of the jetting state, and the light acceptor 25b accepts the permeated detection light c.

The light detection means 22 computes a transmissivity of the detection light c of the atomized lubricant h and a flow rate of the atomized lubricant h relevant to the transmissivity. Then, the computer control board judges the quality of jetting state of the atomized lubricant h.

When the jetting state is good, jets of the atomized lubricant h is once stopped, the cutter 17 is pulled out of the cylindrical member 21, and thereafter, an air feed of the fluid feed means 23 is stopped. Next, when the cutter 17 arrives near the machining position of the work, the atomized lubricant h is made to jet on the same conditions as the time of detection of the atomized lubricant jetting state detector 20, and the work is cut.

On the other hand, when the jetting state is not good, the computer control board changes an opening degree of the flow rate-adjusting valve so as to make the jetting state good. Then, after the jetting state becomes good and the atomized lubricant jetting state detector 20 detects it, the same operations as the above-mentioned will be carried out. That is, jets of the atomized lubricant h is once stopped, the cutter 17 is pulled out of the cylindrical member 21, and thereafter, an air feed of the fluid feed means 23 is stopped. Then, when the cutter 17 is displaced and arrives at the machining position of the work the atomized lubricant is made to jet from the tip of the cutter 17 on the same conditions as the time of the detection, and the work is cut by the cutter 17.

In the above-mentioned work machining, the quality of jetting state of the atomized lubricant h is decided through the lubricant jetting state detector 20 before the work machining. However, when a large number of work machining is intermittently carried, the decision can be made whenever individual or a suitable number of work machining is completed.

Besides, the lubricant jetting state detector 20 can be used as a cutter existence detector besides detecting the jetting state of the atomized lubricant h. The operation example will be as follows.

Figure 3:
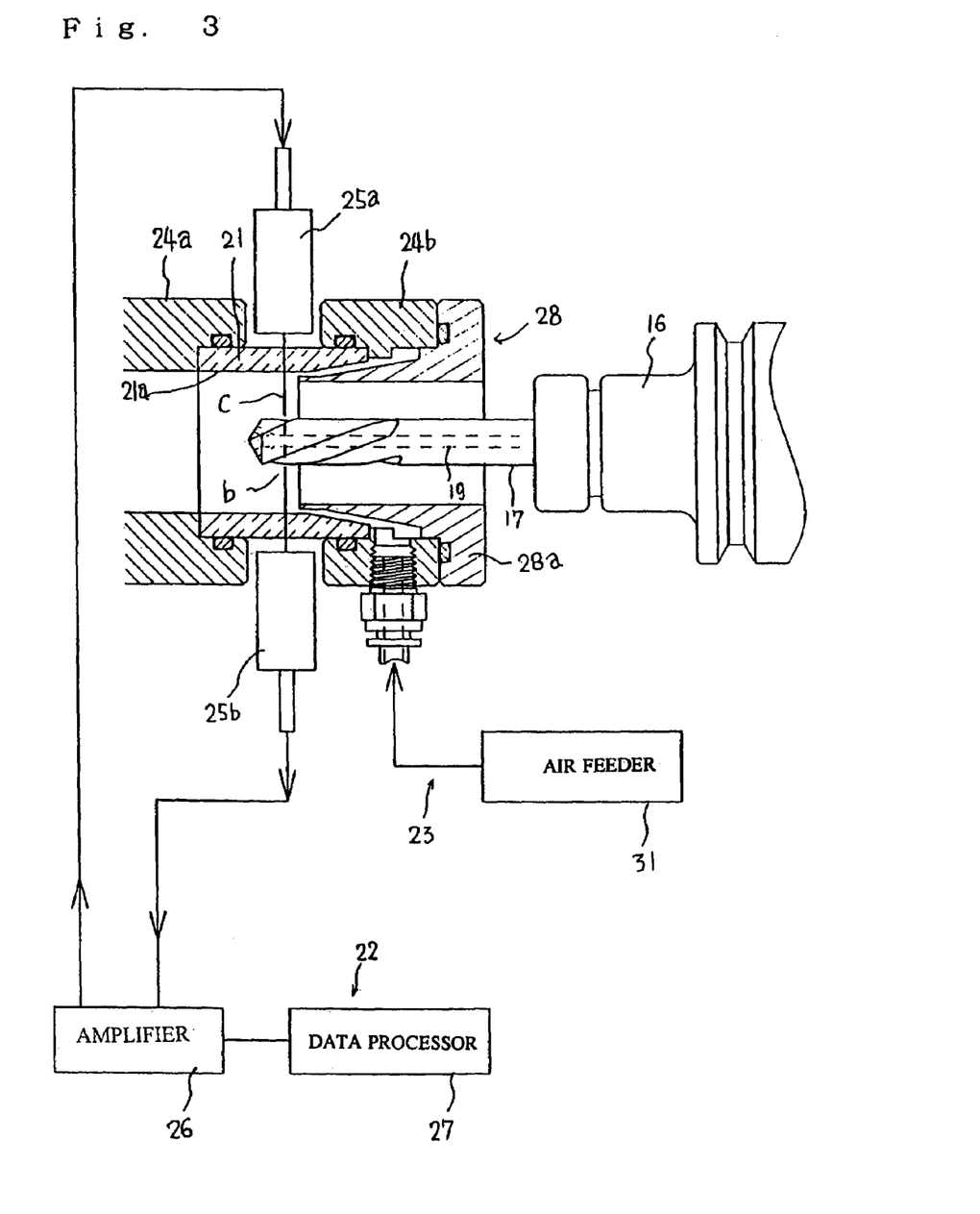
FIG. 3 is a section view showing a situation that the lubricant jetting state detector detects existence of a cutter.

When detecting existence of a cutter, the cutter 17 is displaced further forward than the above-mentioned case as shown in FIG. 3 and once stopped when the tip thereof agrees with the specified position b.

On this condition, the light detection means 22 detects similarly. In this case, if the cutter 17 exists at the specified position b, the transmissivity becomes zero because the detection light c injected from the light projector 25a is completely intercepted on the tip of the cutter 17. On the other hand, if the tip of the cutter 17 breaks and does not exist, the transmissivity becomes 100% because the detection light c injected from the light projector 25a permeates completely.

The computer control board reads existence or non-existence of a cutter from such differences of the transmissivity. When it judges that the cutter 17 normally exist, work machining is carried out. On the other hand, when it judges that the cutter 17 does not exist, the spindle 14 is put back to the initial position and work machining is stopped, and besides, a warning to inform the non-existence of the cutter 17 is issued. Though the detection of the existence or non-existence of the cutter like this can be optionally carried out, carrying out it in connection with the detection of the jetting state of the atomized lubricant h is rational for shortening a moving distance of the cutter 17.

Next, modifications of the lubricant jetting state detector 20 will be explained. In the following explanation, only points different from the above-mentioned embodiment will be explained, and the same parts as the above-mentioned are put the same reference marks and omitted their explanation.

Figure 4:
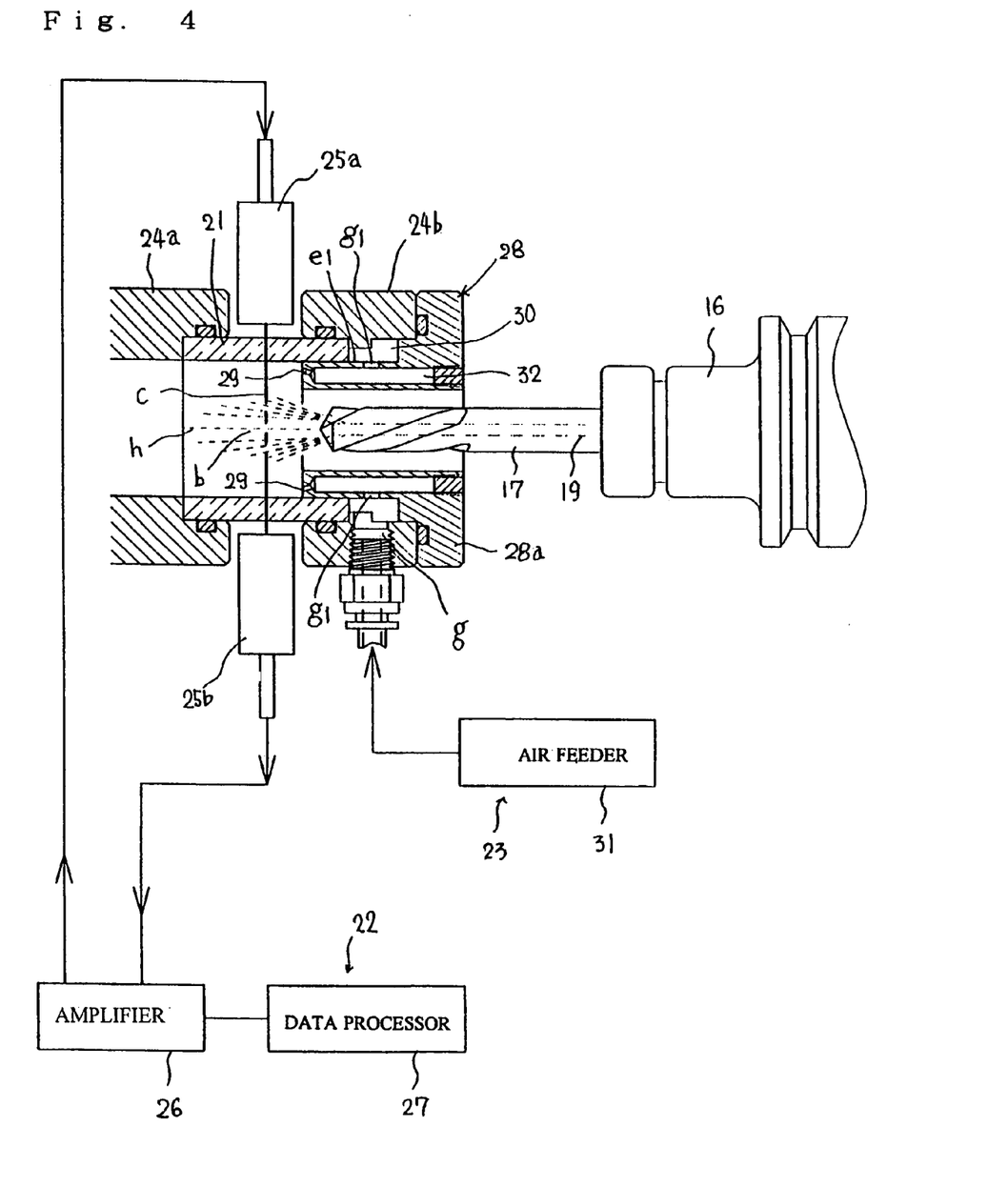
FIG. 4 is a view showing a modified embodiment of the lubricant jetting state detector.

As shown in FIG. 4, a fluid feed means 23 comprises the rear of the cylindrical member 21, the rearward cylindrical supporting member 24b and the inward circular member 28.

The inward circular member 28 is so constructed that the forward outside contact surface e1 forms a straight tubular surface and the rear end forms a flange part 28a. The front end of the forward outside contact surface e1 is closely interfitted to the rear of the cylindrical member 21, and the flange 28a is fixedly bolted to the rear end surface of the rearward cylindrical supporting member 24b.

In this case, the forward outside contact surface e1 of the inward circular member 28 and the inside contact surface of the rearward cylindrical supporting member 24b form an air feed chamber 30. Air is fed into the air feed chamber 30 from the external air feeder 31 through the through hole g formed to the peripheral wall portion of the rearward cylindrical supporting member 24b.

Besides, a circular air accumulation chamber 32 is provided to the thickness part of a forward cylinder of the inward circular member 28. Air injection nozzles 29 each having a rather small caliber are provided to the circular front wall of the air accumulation chamber 32 at a fixed interval in the circumference direction. And a suitable number of air holes g1 for communicating to the air feed chamber 30 are provided to the outside contact surface of the air accumulation chamber 32.

In the above-mentioned fluid feed means 23, air is fed into the air feed chamber 30 from the through hole g, and jets forward from the air injection nozzles 29 by way of the air accumulation chamber 32. In this case, the air inside the air accumulation chamber 32 is wholly equalized by drawing effect through the rather wide air feed chamber 30 and the rather small through holes g1, thereby equally jetting from each air injection nozzle 29. Accordingly, the air spouted from each injection nozzle 29 to the cylindrical member 21 forms a rather equally thin layer to the whole inside contact surface of the cylindrical member 21 and equally covers it as flowing forward.

Figure 5:
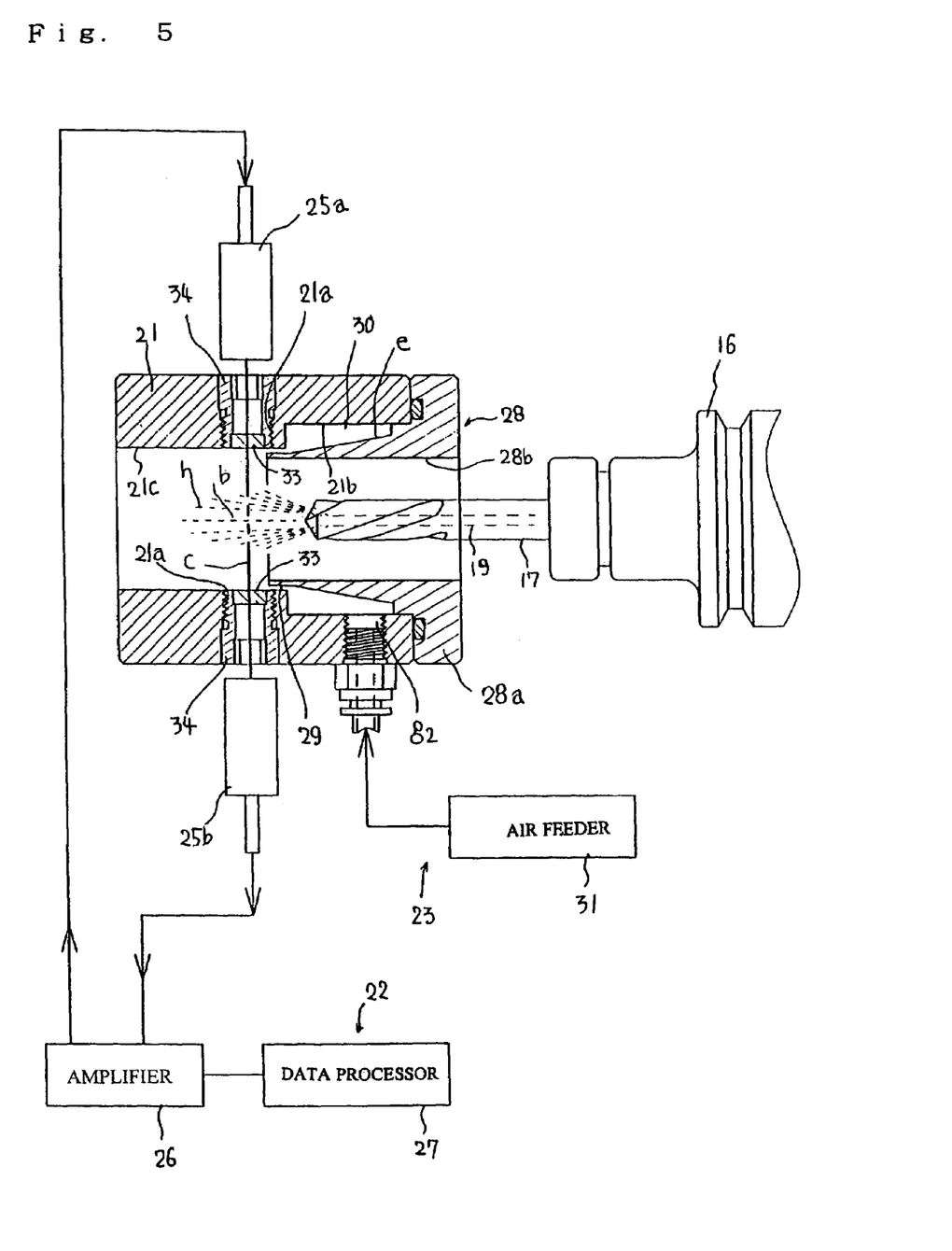
FIG. 5 is a view showing another modified embodiment of the lubricant jetting state detector.

The present invention can be modified as shown in FIG. 5. As for this modification, a cylindrical member 21 is made of opaque metallic materials, and the inward circular member 28 is fixed concentrically to the rear of the cylindrical member 21. The light projector 25a and the light acceptor 25b are provided to opposite positions putting the specified position b between on the outside contact surface of the cylindrical member 21. Thread holes 21a, 21a are provided to the cylindrical member 21, and the parts thereof are made to permeate the detection light c injected from the light projector 25a.

A cylindrical thread 34 for fixing a transparent member 33 is screwed in each thread hole 21a. When cleaning the transparent member 33, the cylindrical thread 34 is removed from the cylindrical member 21. Here, the transparent member 33 is made to permeate the detection light c.

A fluid feed means 23 comprises the rear end of the cylindrical member 21 and the inward circular member 28. A large diameter part 21b is provided to the rearward inside surface of the cylindrical member 21. The inward circular member 28 is so constructed that the forward outside contact surface forms a taper male surface e, the rear end forms a flanged part 28a, and the inner hole 28b forms a straight tubular surface concentric with the taper male surface e. The taper male surface e is concentrically arranged inside the large diameter part 21b, and the flange part 28a is fixedly bolted to the rear end surface of the cylindrical member 21.

An inner hole 21c further before the front end of the large diameter part 21b and the taper male surface e form a circular air injection nozzle 29, and the taper male surface e and the inside contact surface of the large diameter part 21b form an air feed chamber 30. Air is fed into the air feed chamber 30 from the external air feeder 31 through a through hole g2 formed to the peripheral wall portion of the cylindrical member 21.

In the above-mentioned fluid feed means 23, air is fed into the air feed chamber 30 from the through hole g2, and then jets forward from the circular air injection nozzle 29. The air spouted from the air injection nozzle 29 like this forms a rather thin layer to the whole inside contact surface of the cylindrical member 21 and covers it as flowing forward.

The lubricant jetting state detector 20 in the above-mentioned embodiment can be further modified as follows. That is, the light detection means 22 may be so constructed that the light acceptor 25b accepts reflected light in stead of the detection light c permeating the atomized lubricant. Here, the reflected light is what the detection light c injected from the light projector 25a is reflected to detection materials (atomized lubricant h, a cutter 17). Besides, a guide member may be what to be opened such as a U letter cross-section instead of the cylindrical member 21. Moreover, a vertical machining center may be used instead of a horizontal type. Besides, the fluid feed means 23 in each example may be for feeding fluid except for air.

According to the above-mentioned invention, the following effects can be obtained.

The lubricant jetting state detector detects whether the jetting state of the atomized lubricant is normal or not, and precisely decides whether to carry out the after work machining according to the detection results. Therefore, defective products due to work machining with insufficient lubricant are surely prevented from production.

Besides, the lubricant jetting state can be detected labor-savingly in addition to the above-mentioned effect.

Moreover, when the lubricant jetting state detector detects an abnormal jetting state of lubricant, the after work machining of a cutter is automatically stopped, or the abnormal jetting state is modified to a normal one. Therefore, when an abnormal jetting state is detected, proper treatments can be carried out labor-savingly. Besides, defective products due to work machining with insufficient lubricant are surely and labor-savingly prevented from production.

Furthermore, when the abnormality of cutter is detected, the proper treatments can be carried out automatically. Besides, defective products due to using broken cutters are surely and labor-savingly prevented from production.

Besides, the jetting state of the atomized lubricant can be accurately detected.

Moreover, since air fed from the fluid feed means rather equally affects to the whole circumference of the position that the atomized lubricant jets in the inner hole, external-disturbing effects due to the air are effectively prevented from being given to the jetting position. Therefore, the jetting state of the atomized lubricant improves in detection accuracy further.

The invention claimed is:

1. A machine tool, comprising:
   a spindle (14) displaceable in a vertical direction (f1) and/or in a lateral direction, in addition to in a longitudinal direction (f2);
   a cutter (17) forward protrudently fixed to a front end of said spindle (14), the tip of said cutter (17) spouting atomized lubricant (h) forward; and
   a lubricant jetting state detector (20) for detecting a jetting state of the atomized lubricant (h) spouted from the tip of said cutter (17);
   wherein the lubricant jetting state detector (20) is provided to a position within displacement (a) of the cutter (17), the lubricant jetting state detector comprises a cylindrical member (21) having a straight inner hole (21a), said lubricant jetting state detector (20) injects detection light (c) to a specified position (b) inside the inner hole (21a) and detects the degree of transmission or reflection of the detection light (c).

2. A machine tool as claimed in claim 1, wherein said cutter (17) is inserted into the cylindrical member (21) having the straight inner hole (21a), and the detection light (c) is injected dozens of mm in front of the tip of the cutter (17) from which the atomized lubricant spouts.

3. A machine tool as claimed in claim 1, wherein when said lubricant jetting state detector (20) detects an abnormal jetting state of lubricant, machining of said cutter (17) is automatically stopped or the abnormal jetting state is automatically modified to a normal jetting state.

4. A machine tool as claimed in claim 1, wherein the tip of said cutter (17) is displaced to the specified position injected with the detection light of the lubricant jetting state detector (20) before beginning machining and/or after finishing machining, and a cutter's existence is detected due to the detection light (c).

5. A lubricant jetting state detector for a machine tool, comprising:

a guide member (21) having a straight inner hole (21a);

a light detection means (22) for detecting degree of transmission or reflection of detection light (c) due to injecting said detection light (c) to a specified position (b) inside the inner hole (21a) through a transparent member (33) installed on a peripheral wall portion of the guide member (21) or through a transparent peripheral wall portion of the guide member (21); and a fluid feed means (23) for feeding clean fluid of a rather thin layer flowing in a specified direction (f20) along a longitudinal direction of the inner hole (21a) so as to cover the transparent member (33) or the neighborhood of an inner surface of the transparent peripheral wall portion;

wherein said fluid feed means (23) is so constructed that an air injection nozzle (29) for circularly injecting in a size related to a caliber of said inner hole (21a) is concentrically arranged in the inner hole (21a), and air injected from the air injection nozzle (29) covers the whole inside surface of the guide member (21) at the specified position (b) inside the inner hole (21a) in a rather thin layer.

* * * * *